United States Patent [19]
Schenck

[11] Patent Number: 6,082,758
[45] Date of Patent: Jul. 4, 2000

[54] DRIVER AIR BAG HORN GROUND SPRING

[75] Inventor: Michael Allen Schenck, Miamisburg, Ohio

[73] Assignee: General Motors Corporation, Detroit, Mich.

[21] Appl. No.: 09/135,275

[22] Filed: Aug. 17, 1998

[51] Int. Cl.[7] .............................. B60R 21/16; H01H 9/02
[52] U.S. Cl. .................. 280/728.2; 280/731; 200/61.55; 200/305
[58] Field of Search ............................ 280/728.2, 728.3, 280/731, 735, 732; 200/61.54, 61.55, 61.56, 61.57, 305

[56] References Cited

U.S. PATENT DOCUMENTS

| | | | |
|---|---|---|---|
| 4,004,114 | 1/1977 | Baduel | 200/61.56 |
| 4,111,407 | 9/1978 | Stager | 267/166 |
| 4,785,144 | 11/1988 | Fosnaugh et al. | 200/61.55 |
| 5,380,037 | 1/1995 | Worrell et al. | 280/728.2 |
| 5,410,114 | 4/1995 | Furuie et al. | 200/61.55 |
| 5,508,482 | 4/1996 | Martin et al. | 200/61.55 |
| 5,588,673 | 12/1996 | Green et al. | 280/731 |
| 5,801,349 | 9/1998 | Komiya et al. | 200/61.55 |
| 5,873,596 | 2/1999 | Kantoh et al. | 280/728.2 |

*Primary Examiner*—J. J. Swann
*Assistant Examiner*—Christopher D. Bottorff
*Attorney, Agent, or Firm*—Kathryn A. Marra

[57] ABSTRACT

An air bag module and steering wheel assembly having an air bag module including a horn switch and a circuit for grounding the switch through a steering wheel in which it is assembled. The air bag module includes a base plate upon which an air bag is mountable, and a plurality of cylindrical mounting members and a membrane horn switch. The base plate is affixed to the steering wheel insert by the cylindrical mounting members which are received in apertures in the steering wheel insert. The horn switch is electrically connected to a power source and the base plate. A conical spring surrounds at least one of the mounting members and engages both the base plate and the steering wheel insert to provide a ground path between them, eliminating the need for a ground wire directly between the air bag module and the steering wheel insert.

5 Claims, 1 Drawing Sheet

DRIVER AIR BAG HORN GROUND SPRING

TECHNICAL FIELD

This invention relates to air bag modules and, more particularly, to a driver air bag module having a conical spring which provides a ground to complete a horn circuit.

BACKGROUND OF THE INVENTION

It is known in the art relating to air bag modules to provide a horn switch within a driver air bag module. The horn switch is usually electrically connected to the horn through a power wire and a ground wire extending from the air bag module. The power wire is positioned along the steering column through a hole in a steering wheel insert. The ground wire is connected to the steering wheel insert which is grounded through a steering column attachment.

The ground wire is attached to the steering wheel insert at the vehicle assembly plant by pushing the ground wire over a stud mounted on the steering wheel. Access to the stud is restricted and thus insertion of the ground wire is difficult. It is desirable to eliminate the difficult insertion of the ground wire by creating a ground path between the air bag module and the steering wheel insert that is attached to the driver air bag module at the module assembly location.

SUMMARY OF THE INVENTION

The present invention provides a horn assembly that is grounded upon mounting of a driver air bag module upon a steering wheel insert. The air bag module includes a base plate upon which an air bag is mounted. A container encloses the air bag and is connected to the base plate. A membrane horn switch is located within the air bag module. The horn switch is electrically connected to the base plate and to a power source whereby a horn circuit is closed and a horn is activated when the container is depressed to close the horn switch. A plurality of elongated cylindrical mounting members are affixed to the air bag module. In assembly, the mounting members are retained within apertures of the steering wheel insert, securing the air bag module to the steering wheel insert.

A conical spring is attached to each, or at least one of the mounting members and is compressed between the base plate and the steering wheel insert for biasing the air bag module outwardly from the steering wheel insert. The conical spring also provides an electrical connection, or ground path, between the base plate and the steering wheel insert to complete the horn circuit. Such an assembly eliminates the difficult task of connecting the ground wire from the air bag module to the steering wheel insert at the vehicle assembly plant.

These and other features and advantages of the invention will be more fully understood from the following description of a preferred embodiment of the invention taken together with the accompanying drawings.

DESCRIPTION OF THE PREFERRED EMBODIMENT

Figure 1:
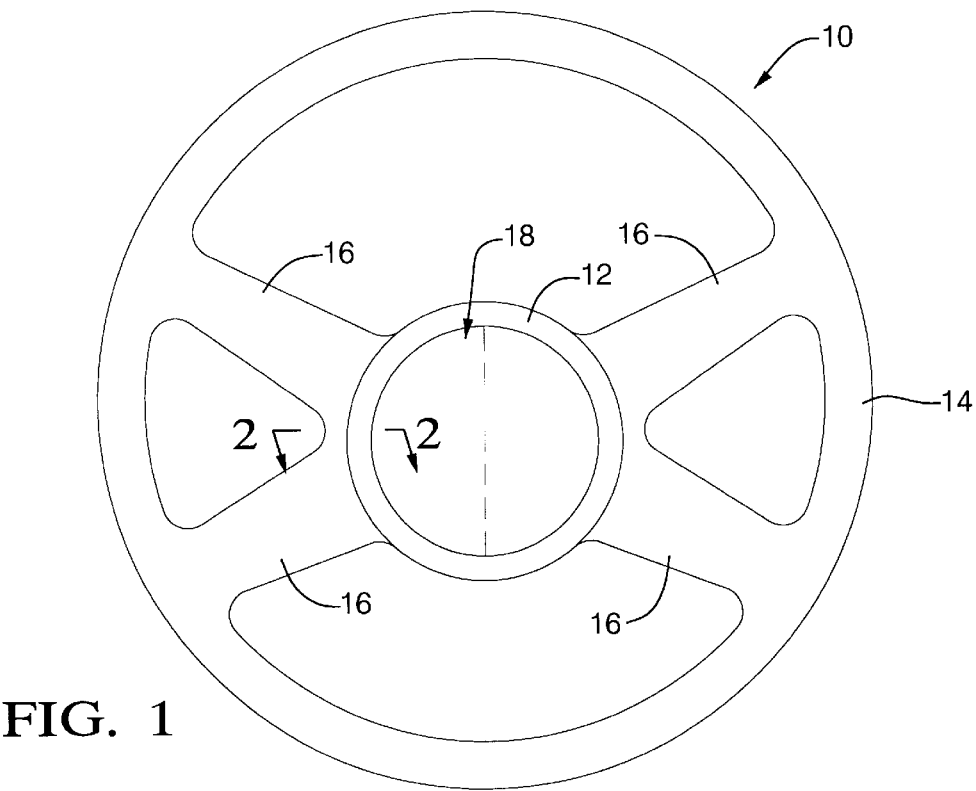
FIG. 1 is plan view of an air bag module and steering wheel assembly.

Referring first to FIG. 1 of the drawings in detail, numeral 10 generally indicates a steering wheel for a vehicle. The steering wheel 10 includes a central hub portion 12, a generally circular outer rim portion 14 and a plurality of spokes 16 extending between the hub portion 12 and the rim portion 14. An air bag module 18 is mounted within the hub portion 12. The steering wheel 10 is affixed to a steering column (not shown).

Figure 2:
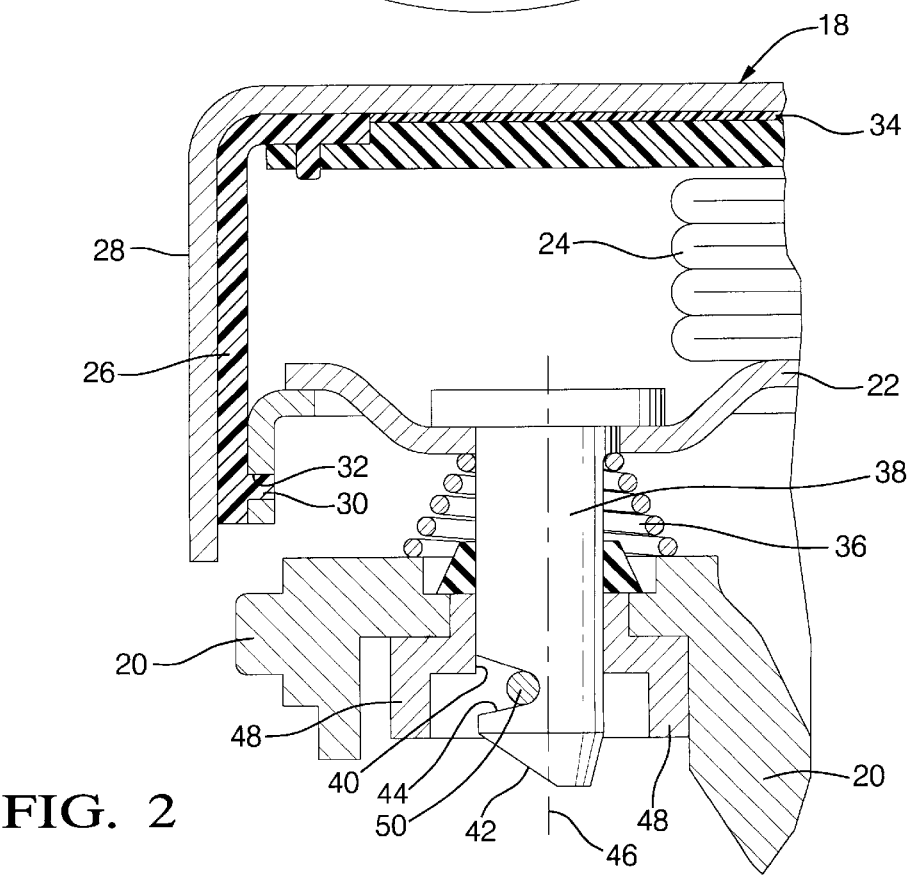
FIG. 2 is a cross-sectional view from the line 2—2 of FIG. 1.

Referring to FIG. 2, a steering wheel insert 20 is provided which is fixed to a steering column, not shown, on which the steering wheel 10 is mounted. The air bag module 18 is attached to the steering wheel insert 20 through means to be subsequently described.

The air bag module 18 has a base plate 22 for mounting an air bag 24 and an inflator (not shown). The base plate 22 is made from an electrically conductive material. The air bag 24 and the inflator are enclosed within a container 26 which is covered by an outer pad 28. Preferably, the container 26 is secured to the base plate 22 by snapping lugs 30 spaced around the container's periphery into slots 32 of the base plate 22. Alternatively, the container can be secured to the base plate by fasteners, such as screws.

A thin membrane horn switch 34 is mounted beneath the outer pad 28. Alternatively, two membrane horn switches may be mounted beneath the outer pad on opposing sides of a central tear seam in the outer pad. Two electrical wires (not shown) extend from the membrane horn switch 34. The electrical wires are connected one to a power source and the other to the base plate 22 which are parts of a horn circuit. The horn circuit includes the membrane horn switch 34, base plate 22, a conical spring 36, and the steering wheel insert 20, steering column, power source and horn. The membrane horn switch 34 may be of any conventional construction. For example, it may be include two thin sheets having conductive coatings separated by thin spacers. Upon application of pressure to the membrane horn switch 34, the conductive surfaces are brought together to close the horn circuit and actuate the horn.

For mounting the air bag module 18 on the steering wheel insert 20, a plurality of elongated cylindrical mounting members 38 are affixed to the base plate 22 and extend therefrom into apertures 40 of the steering wheel insert 20. The conical spring 36, made of an electrically conductive material, surrounds at least one of the mounting members 38 and is compressed between the base plate 22 and the steering wheel insert 20. The conical shape of the spring 36 allows it to provide an electrical connection, or ground path, between the air bag module 18 and steering wheel insert 20, completing the horn circuit. By providing the ground path, the conical spring 36 eliminates the need to connect the ground wire from the air bag module 18 directly to the steering wheel insert 20. The conical spring 36 also biases the air bag module 18 outwardly away from the steering wheel insert 20.

In a preferred embodiment, four mounting members 38 are attached to the base plate 22. Each of the mounting members 38 includes a tapered distal end 42 and a slot 44 which is elongated in a direction parallel to a longitudinal axis 46 of the mounting member 38.

The steering wheel insert 20 is formed with apertures 40 corresponding in number and location to the number and location of the mounting members 38. The apertures 40 receive the distal ends 42 of the mounting members 38 therethrough. A spring housing 48 is mounted within each aperture 40 of the steering wheel insert 20. The spring housings 48 are preferably formed of an insulating material, such as a plastic.

Each of the spring housings 48 contains a resilient member, such as a spring 50. When each spring 50 makes contact with the mounting member 38, as the air bag module 18 is assembled with the steering wheel insert 20, the spring 50 yields in a direction transverse to the longitudinal axis 46, permitting insertion of the mounting members 38 through the apertures 40 and past the springs 50. After the mounting members 38 are fully inserted, the springs 50 slide into the respective slots 44 of their respective mounting members 38, thereby retaining the mounting members 38 within the apertures 40.

Each mounting member 38 is surrounded by a conical spring 36. The conical springs 36 bias the air bag module 18 outwardly from the steering wheel insert 20 and provide a ground path between the base plate 22 and the steering wheel insert 20 to complete the horn circuit. Thus, the horn circuit is grounded upon the mounting of the air bag module 18 to the steering wheel insert 20, without the direct connection of a ground wire.

While the invention has been described by reference to a preferred embodiment, it should be understood that numerous changes could be made within the spirit and scope of the inventive concepts described. Accordingly it is intended that the invention not be limited to the disclosed embodiment, but that it have the full scope permitted by the language of the following claims.

I claim:

1. An air bag module and steering wheel assembly comprising:
   an air bag module including
      a base plate,
      an air bag mounted on the base plate,
      a container enclosing the air bag and connected to the base plate,
      a horn switch in the air bag module electrically connected to the base plate and connectable to a power source whereby a horn circuit is closed and a horn is activated when the container is depressed, and
      a plurality of elongated cylindrical mounting members affixed to the base plate for securing the module to a steering wheel insert;
   the steering wheel insert attachable to an electrically grounded steering column and having a plurality of apertures receiving the mounting members; and
   a conical spring surrounding at least one of the mounting members and compressed between the base plate and the steering wheel insert for biasing the air bag module outwardly away from the steering wheel insert and providing an electrical contact between the air bag module and the steering wheel insert whereby the horn circuit is grounded through the conical spring.

2. The assembly of claim 1 wherein each mounting member is surrounded by a conical spring.

3. The assembly of claim 1 wherein the horn switch is a membrane horn switch and comprises two very thin conductive sheets having conductive coatings which are spaced by thin spacers, whereby pressure on the switch presses the conductive sheets together to close the horn circuit and activate the horn.

4. The assembly of claim 1 wherein each mounting member has a tapered distal end and a slot which is elongated in a direction parallel to a longitudinal axis of the mounting member and the steering wheel insert has a resilient member associated in each aperture of the steering wheel insert, said resilient member engaging the slot of the mounting member to retain the mounting member within said aperture.

5. An air bag module and steering wheel assembly comprising:
   a base plate having a bottom surface;
   an air bag positioned atop the base plate;
   a horn circuit electrically connected to the base plate;
   a steering wheel insert having a plurality of apertures therein;
   a plurality of elongated mounting members affixed to the base plate for securing the module to the steering wheel insert;
   a conical spring surrounding at least one of the mounting members and compressed between the bottom surface of the base plate and the steering wheel insert for biasing the air bag module outwardly away from the steering wheel insert and providing electrical contact between the air bag module and the steering wheel insert whereby the horn circuit is grounded through the conical spring.

* * * * *